UNITED STATES PATENT OFFICE.

ALMER McDUFFIE McAFEE, OF PORT ARTHUR, TEXAS, ASSIGNOR TO GULF REFINING COMPANY, OF PITTSBURGH, PENNSYLVANIA, A CORPORATION OF TEXAS.

MANUFACTURE OF ALUMINUM CHLORID.

1,217,471.  Specification of Letters Patent.  Patented Feb. 27, 1917.

No Drawing.  Application filed September 29, 1916. Serial No. 122,869.

*To all whom it may concern:*

Be it known that I, ALMER McDUFFIE McAFEE, a citizen of the United States, residing at Port Arthur, in the county of Jefferson and State of Texas, have invented certain new and useful Improvements in the Manufacture of Aluminum Chlorid, of which the following is a specification.

This invention relates to the manufacture of aluminum chlorid; and it comprises a method of making aluminum chlorid wherein bauxite, or other form of hydrated alumina, without removing its water of hydration, is intimately commingled with a caking or coking coal, formed into briquets, any suitable binder being used, and the briquets coked, such briquets being then exposed to the action of heat and chlorin, or chlorin containing gas, such as HCl, or a mixture of HCl and a reducing gas, the aluminum chlorid formed being recovered by cooling the sublimed vapors; all as more fully hereinafter set forth and as claimed.

While in principle the operation of making aluminum chlorid in the anhydrous form by passing chlorin over a mixture of carbon and alumina at a high temperature is simple enough, in practice there are many difficulties when working on the large scale. Many of these difficulties reside in the fact that it is hard to produce an intimate contact of the carbon with the alumina and of the chlorin with both. Both carbon and alumina are infusible materials and their particles do not come into actual contact to any material degree even when very finely ground and compressed together. With an ordinary mixture of the two materials in powdered form, even though quite intimate, there is little actual contact, in the chemical sense, between the two; and for action, reliance must be based on the vapor tension of the carbon which at the relative low temperature necessary for forming aluminum chlorid, is not great. In using the two together they must be ground, in the ordinary operation, not only very fine but to induce reaction the temperature must be raised to a very high degree; a temperature at which the retorts suffer more or less under the conjoint action of the chlorin and carbon. Further, it is found in practice that heating the alumina to too high a temperature lessens its reactivity in making aluminum chlorid. And with very fine and intimate pulverulent mixtures of alumina and carbon there arise draft difficulties in passing chlorin through the mass.

By reason of the difficulties stated, it has become the practice to make either the double chlorid of aluminum and sodium in which these difficulties do not exist to so great an extent, or to make the aluminum chlorid from metallic aluminum and chlorin; which is a relatively expensive operation.

I have found however that by a certain particular procedure I can obviate the noted difficulties and attain a number of new advantages. In this method, I produce the necessary intimate contact between the alumina and the carbon by using a fat or rich coal of the nature of those called coking or caking coals. The coking coal and the alumina are first ground to a very fine powder, say about 100 mesh, although finer may be used with advantage and somewhat coarser is susceptible of use. The two powders are next mixed very intimately. The amount of coal is so selected that after coking it will yield the amount of carbon necessary to reduce the alumina with about 20 per cent. excess. The mixture is next formed into briquets or cakes under high pressure. In so doing, a temporary binder, such as molasses, sticky petroleum products, retort residues, asphalts, etc., is advantageously used. There is room, however, for much choice in these materials. It is desirable to use for the temporary binder something having a maximum stickiness since it is desirable to reduce the quantity as much as possible; and also the binder should be one which will persist until the coal begins to coke. The choice in quantity and quality of binder, however, depends somewhat on the particular coal used. The best binder I have found is a special gummy product, somewhat like wax tailings, which may be obtained by distilling wax tailings and taking the fractions which are of specially sticky character.

In the best way of operating, the fine coal and fine alumina are mixed together and heated somewhat; the temporary binder is then added and heating and stirring continued until the mixture is sufficiently intimate. This mixture is then briqueted under heavy pressure to give as dense a product as possible. A pressure of about 4000 pounds works well. The briquets are next charged into a hot retort and coked at a temperature sufficiently high to drive off the water of hydration and coke the coal, care being taken that it is not high enough to cause the bauxite to become dense and chemically inert, say around 1600° F. with many coals.

In operating as just described, the coking coal and the binder permeate the particles of alumina producing a particularly intimate mixture prior to the coking of the coal.

In this coking a hard, rigid bauxite-coke briquet is formed if the coal be of good coking quality. If the alumina chosen be of the anhydrous kind, that is, dehydrated bauxite or the like, the briquets will be entirely too dense; neither is the briquet so produced as reactive with chlorin as a briquet made with hydrated alumina. Using bauxite or hydrated alumina in the coking operation the alumina dehydrates and makes the material porous; this porosity extending to the particles of alumina in the mixture. That is, the final briquet is not only more porous considered as a briquet but the very fine carbon-permeated alumina particles in the briquet are in themselves also porous. I find this quite a necessary condition to get the best results. As the hydrated alumina may be used, ordinary commercial undehydrated bauxite or any other native form of hydrated alumina may be used, such as diaspore, gibbsite, etc. As bauxite comes from the mines it carries 8 to 12 per cent. of what may be termed physical moisture; it is more or less damp. In addition it carries around 30 per cent. of chemically combined water which is water of hydration. It is this water of hydration which I find it necessary to retain in the material, but I ordinarily dry the crude bauxite so as to get rid of the moisture mechanically present.

The briquets made as described may be coked in any of the usual coking furnaces. After the coking they may be treated with chlorin in any form of retort made of a good refractory clay. Vitrified clay retorts are best. These retorts may be heated in any suitable manner, either internally or externally.

I have found that with briquets made as described the chlorinating action goes on at 1600° to 1800° F. although temperatures a little above and a little below this may be used. But I find there is no great increase in the speed of the reaction at temperatures much above this; the alumina becoming less reactive through internal changes, while temperatures much above this are hard on the retorts. While, as stated, the chlorination may be in any type of retort, the reactivity of the mixture made as described renders possible the use of vertical retorts which are convenient for introducing the chlorin and removing the aluminum chlorid.

I find it advantageous to use a type of vertical retort in which I introduce chlorin or hydrochloric acid gas at the top and remove vapors of aluminum chlorid at the bottom. This mode of introduction is in accordance with specific gravities of the chlorin gas and the aluminum chlorid vapors and contributes materially to a smooth and uniform operation with a maximum utilization of both chlorin and alumina.

With the proportions stated the briquets substantially all disappear, there being a residue of free carbon and ash; this ash being from the coal and impurities in the bauxite.

The aluminum chlorid formed contains some iron chlorid and, sometimes, a little titanium chlorid where the crude bauxite has been used. It may be employed as such for oil conversion and many other actions in which the catalytic properties of anhydrous aluminum chlorid are utilized and in which the presence of these bodies is immaterial. If for any reason it is to be purified, this may be done by resublimation.

Where a pure aluminum chlorid is desired, the bauxite used may be initially purified to free it of iron, titanium, etc., by any of the well known methods, such as heating with caustic soda solutions, etc. Or specially prepared pure, artificial alumina hydrates may be used. But for most purposes I can take the crude bauxite as it comes from the mines.

What I claim is:—

1. In the manufacture of aluminum chlorid the process which comprises intimately incorporating finely divided hydrated alumina and coking coal, coking the mixture and treating with chlorin.

2. In the manufacture of aluminum chlorid the process which comprises intimately incorporating finely divided undehydrated bauxite and coking coal, coking the mixture and treating with chlorin.

3. In the manufacture of aluminum chlorid the process which comprises intimately incorporating finely divided hydrated alumina, coking coal and a temporary binder, coking the mixture and treating with chlorin.

4. In the manufacture of aluminum chlorid the process which comprises intimately incorporating finely divided undehydrated bauxite, coking coal and a temporary binder, coking the mixture and treating with chlorin.

5. In the manufacture of aluminum chlorid the process which comprises intimately incorporating finely divided hydrated alumina and coking coal, coking the mixture and treating with gas comprising chlorin.

6. In the manufacture of aluminum chlorid the process which comprises intimately incorporating finely divided undehydrated bauxite and coking coal, coking the mixture and treating with gas comprising chlorin.

7. In the manufacture of aluminum chlorid the process which comprises intimately incorporating finely divided hydrated alumina, coking coal and a temporary binder, coking the mixture and treating with gas comprising chlorin.

8. In the manufacture of aluminum chlorid the process which comprises intimately incorporating finely divided undehydrated bauxite, coking coal and a temporary binder, coking the mixture and treating with gas comprising chlorin.

In testimony whereof, I affix my signature.

ALMER McDUFFIE McAFEE.

Witnesses:
GEORGE H. TABER,
WESLEY A. LOONEY.